Figure 1:
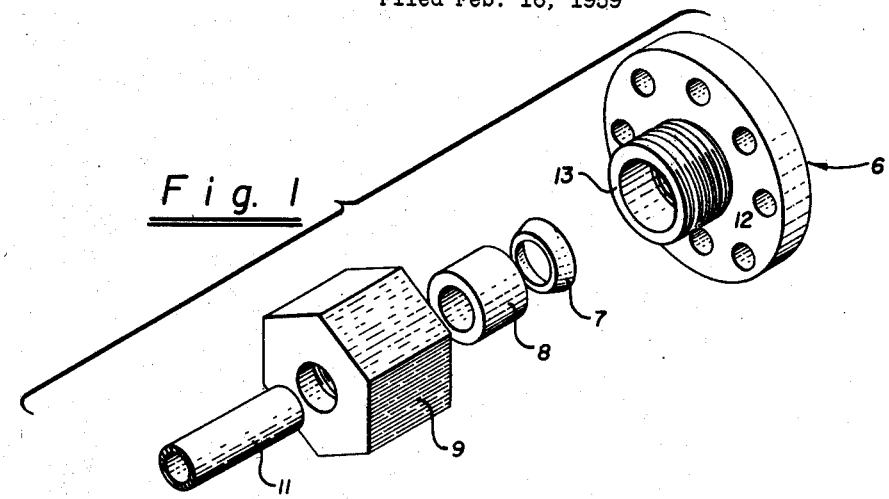

Jan. 8, 1963 W. A. LLOYD ETAL 3,072,421
COUPLING ASSEMBLY
Filed Feb. 16, 1959

INVENTORS
William A. Lloyd
Donald R. Ness
BY
Attorney

United States Patent Office 3,072,421
Patented Jan. 8, 1963

3,072,421
COUPLING ASSEMBLY
William A. Lloyd, Los Altos, and Donald R. Ness, Palo Alto, Calif., assignors to Varian Associates, Palo Alto, Calif., a corporation of California
Filed Feb. 16, 1959, Ser. No. 793,496
2 Claims. (Cl. 285—189)

This invention relates in general to coupling devices and more particularly to a novel coupling or coupling assembly suited for use, for example, as an exhaust port coupling which combines simplicity of construction, ease in assembly and creation and maintenance of a high vacuum or high pressure seal.

In both vacuum and pressure systems there has been a great need for a coupling assembly which can quickly and easily couple two members together and also create a high vacuum or high pressure seal between the two members. In old coupling assemblies tubing often had to be flared at its end and a coupling nut placed on the tubing before the end was flared. In such an assembly, if both ends of a tube were to be coupled in a similar manner, the proper length of tubing had to be cut, two nuts placed thereon and then the ends flared. Thus, unless a person had the proper equipment for flaring the ends of a tube at the job site, all tubing would have to be pre-cut to specifications, nuts placed on the tubes and the tube ends flared before delivery to a job site allowing great possibilities for error. Also, in coupling assemblies in which the flared end of a tube was screwed against a burr formed on the tapered end of a threaded pipe, small chips were apt to be formed by the turning of the flared end of the tube against the burr and these chips often cut the tube and ruined the vacuum or pressure seal. In another old type of coupling an O ring of rubber or the like was compressed to create a seal, but many such coupling assemblies had to undergo serious temperature changes and were not able to maintain a high vacuum or high pressure seal without being cooled or heated to more nearly standard conditions.

The object of the present invention is to provide a novel, rugged, efficient and inexpensive conduit coupling assembly suitable as an exhaust port coupling assembly that eliminates the above mentioned difficulties encountered with previous coupling assemblies.

One feature of the present invention is the provision of a novel coupling assembly that can be used on standard tubing or conduit without requiring any flaring or manipulation of the end of such tubing or conduit prior to making the coupling.

Another feature of the present invention is the provision of a coupling assembly including an inexpensive throw-away washer member for creating a seal by deforming a tube slidably fitted within the assembly.

Still another feature of the present invention is the provision of a novel coupling assembly with a body member and an apertured element adapted to be tightly engaged together to deform a washer positioned between the body member and the apertured element.

Figure 2:
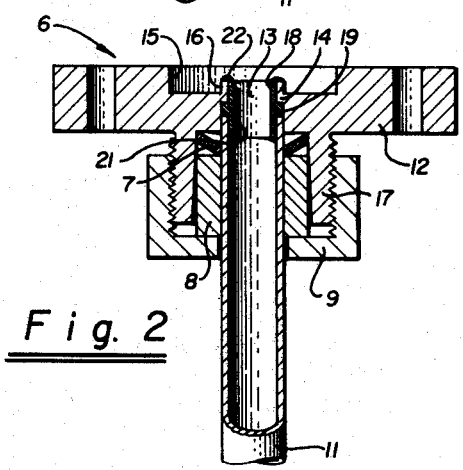
Figure 3:
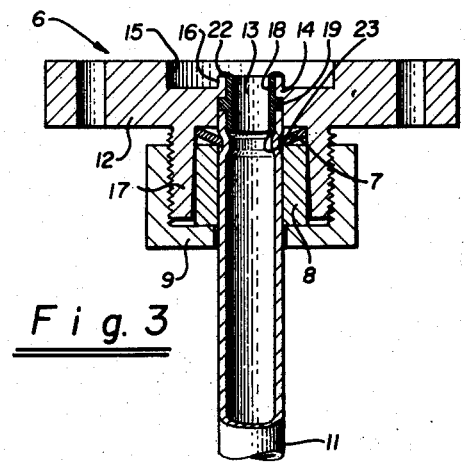
Figure 4:
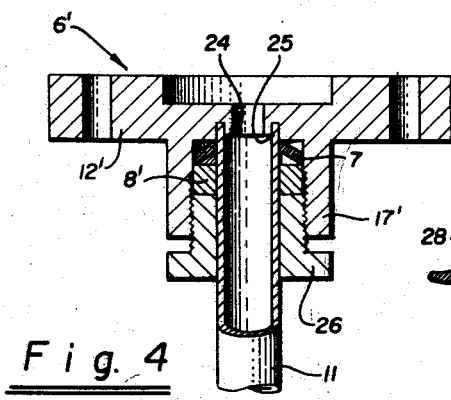
Figure 5:
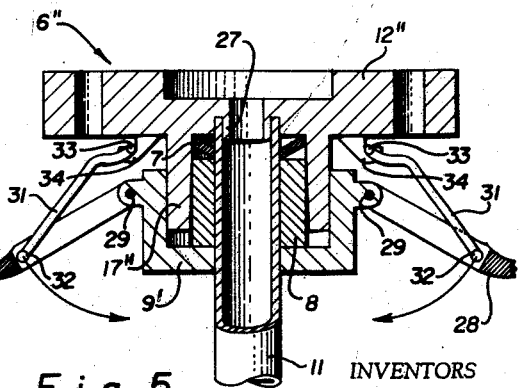

These and other features and advantages of the present invention will be more apparent after a perusal of the following specification taken in connection with the accompanying drawing wherein, FIG. 1 is an exploded perspective view showing the component parts of a novel coupling assembly embodiment of the present invention, FIG. 2 is a longitudinal cross-section view of the component parts of the coupling assembly shown in FIG. 1 with the components engaged prior to the creation of the seal, FIG. 3 is a cross-section view of the component parts of the coupling assembly shown in FIG. 1 in coupling and sealing engagement, and FIGS. 4 and 5 are longitudinal cross-section views of two additional embodiments of the present invention.

Referring now to FIGS. 1, 2 and 3 the novel coupling assembly is shown, for purposes of illustration, as utilized in coupling a tube 11 of, for example, copper to a body member 6. This body member 6 may, for example, be bolted to another body member which is in turn coupled to another tube or it may be fixed onto a component of a vacuum or pressure system or it may itself represent the body of a component of a vacuum or pressure system. The coupling assembly comprises the body member 6, a frusto-conical washer 7, a cylindrical compression ring 8, and an apertured cap element 9. These members may be made of stainless steel, tool steel or other suitable material.

The body member 6 comprises first an annular flange 12 having an exhaust port 13 and an annular shoulder 14 directed toward the exhaust port 13, the flange 12 also having on one side an annular indentation 15 surrounding the exhaust port 13 and leaving an annular projecting edge 16 around exhaust port 13, secondly an externally threaded nipple 17 extending from the side of flange 12 opposite the indentation 15 and surrounding the exhaust port 13 and finally a hollow cylindrical bushing 18 with an outwardly directed annular shoulder 19, the bushing 18 being fixed to the flange 12 to surround the exhaust port 13 when inserted into flange 12 from the nipple side of flange 12 so that the shoulder 19 of bushing 18 abuts the shoulder 14 of flange 12 and the bushing 18 and the flange 12 define an annular recess surrounding exhaust port 13 within the nipple 17, the recess being adapted to receive the end of tube 11. The other end of tube 11 (not shown) is connected, for example, to a vacuum tube cavity that is to be evacuated or to any other component of a vacuum or pressure system. A projecting portion 21 of bushing 18 extends past the side of the flange 12 within nipple 17 to provide an edge about which tube 11 can be deformed as will further appear.

The bushing 18 and the projecting edge 16 of flange 12 are fixed together by a braze 22 or the like creating a seal between flange 12 and bushing 18. In this manner, should projecting portion 21 of bushing 18 become damaged, bushing 18 can be easily removed and replaced by simply filing off the braze 22 and withdrawing bushing 18 from the flange 12.

The washer 7 slidably fits within nipple 17 and has an inside diameter of such size as to receive tube 11. The compression ring 8 has the same outside and inside diameter as washer 7, and the combined length of washer 7 and compression ring 8 is slightly greater than the depth of the bore nipple 17. The apertured cap element 9 is inwardly threaded for screw-mounting on nipple 17 and is apertured through its end to receive tube 11.

In assembling, washer 7 is first inserted within nipple 17 with the base of the frusto-conical washer configuration abutting the flange 12. The compression ring 8 is inserted within nipple 17 abutting washer 7, and the element 9 is then screwed onto nipple 17. The tube 11, which is to be connected to body member 6, is inserted through element 9, compression ring 8 and washer 7 and into the recess between bushing 18 and flange 12.

The element 9 is tightened on nipple 17 advancing element 9 and compression ring 8 toward flange 12 thereby deforming washer 7 and compressing tube 11 adjacent the projecting portion 21 of bushing 18 (see FIG. 3). A seal is thus created between bushing 18 and tube 11 at a point 23 and the system may then be pressurized or evacuated as desired.

When the washer 7 has been deformed and compressed onto tube 11, these two members are fixed together, and since the washer 7 is held against flange 12 by compression ring 8 and element 9, tube 11 cannot be removed from the coupling assembly until element 9 is unscrewed from nipple 17. When the assembly is to be decoupled, element 9 is unscrewed from nipple 17 and the element 9 and the compression ring 8 slid back on tube 11 so that the end of tube 11 with washer 7 compressed thereon can be sawed off and discarded. Or, as is most likely the case in a vacuum system, tube 11 will be pinched off behind element 9 before unscrewing element 9 so that the vacuum in the body to which tube 11 is secured will be maintained. In order that tube 11 with washer 7 compressed thereon can be easily withdrawn from nipple 17, the bore of nipple 17 is made slightly larger in the direction away from flange 12.

Referring now to FIG. 4 there is shown a cross-section view of another embodiment of the present invention assembled prior to final sealing engagement. In this embodiment there is no bushing such as 18 since the annular recess in which tube 11 nestles is formed in the flange 12'. An annular portion 24 of flange 12' between the recess and the exhaust port 13 extends toward nipple 17' but is depressed from the side of flange 12' within nipple 17'. By this construction washer 7 can be reversed in direction when it is inserted within nipple 17', and the seal will be created at a point 25 between the corner of the annular portion 24 and the inside of tube 11 thereby avoiding the possibility of virtual leaks. Also in this embodiment the cap element is an outwardly threaded, apertured plug element 26 adapted to be screwed into nipple 17' which has screw threads on its inner surface.

Referring now to FIG. 5 there is shown a cross-section view of still another embodiment of the present invention assembled prior to final sealing engagement. In this embodiment again there is no bushing such as 18, and an annular portion 27 of flange 12'' between the recess and exhaust port 13 extends beyond the side of flange 12'' within nipple 17'' as did bushing 18 described above. Apertured element 9' is clamped to flange 12'' instead of screwed thereon. A toggle clamping arrangement, as shown, can be employed wherein each of a pair of handle arms 28 is pivoted on element 9' by a pivot 29 and is connected at a point along its length to a tension rod 31 by a pivot 32. Each tension rod 31 is in turn connected to flange 12'' by means of a pivot 33 held in, but removable from, a hook 34 on flange 12''. In this and other embodiments of the invention element 9' and cylindrical ring 8 can be an integral member.

A further embodiment of the present invention is a coupling assembly such as shown in FIG. 4 with element 26 clamped, such as in FIG. 5, rather than threaded within nipple 17.

Still a further embodiment of the present invention is a coupling assembly with an outwardly threaded apertured plug element 26 screw threaded into a threaded recess in flange 12 whereby the washer 7 and the cylinder 8 slidably fit within plug element 26.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A vacuum tight coupling assembly for coupling a tube member to a body member comprising, in combination, a body member with a hollow nipple extending therefrom, said body member having an exhaust port within said nipple and provided with an annular recess surrounding and spaced from said exhaust port and aligned with the bore in said nipple, the inside and outside diameters of said annular recess adapted to slideably receive the tube member within said annular recess, a washer having an outside frusto conical surface, an inside frusto conical surface, and an opening therein, said washer having an outside diameter slightly less than the inside diameter of said nipple and having an inside diameter slightly more than the outside diameter of said annular recess, said washer being located within said nipple with the axial inner edge of said washer opening being located axially outward from but adjacent to the axial outward and radial inward edge of said annular recess, a compression means having a portion extending into said nipple and in engagement with the axial outer edge of said washer, said compression means having means for applying an inward axial pressure to said portion whereby upon actuation of the means for applying pressure, the washer is deformed, thereby decreasing the diameter of said opening to deform the inner surface of the tube into sealing engagement with the said edge of said annular recess.

2. The vacuum tight coupling assembly of claim 1 wherein said body member has a stepped diameter bore therethrough within said nipple and has an annular axially projecting portion surrounding the smaller diameter portion of said bore on the opposite side of said body member from said hollow nipple; a hollow cylindrical bushing fitting within the smaller diameter portion of the bore of said body member, said bushing defining said exhaust port in said body member, said bushing provided with a radially outwardly directed annular shoulder portion engaging the step in the diameter of the bore of said body member, the outside diameter of said bushing from said annular shoulder toward said nipple defining said inside diameter of said annular recess, said bushing and said annular projecting portion on said body member being fixedly joined together in sealed engagement at the outwardly projecting ends thereof on the opposite side of said body member from said hollow nipple.

References Cited in the file of this patent

UNITED STATES PATENTS

| | | |
|---|---|---|
| 1,727,694 | Beyer | Sept. 10, 1929 |
| 1,781,581 | Hellyer | Nov. 11, 1930 |
| 2,147,353 | Scholtes | Feb. 14, 1939 |
| 2,209,181 | Wendel | July 23, 1940 |
| 2,456,203 | Leopsinger | Dec. 14, 1948 |
| 2,788,992 | Vienne | Apr. 16, 1957 |
| 2,951,715 | Bauer | Sept. 6, 1960 |

FOREIGN PATENTS

| | | |
|---|---|---|
| 229,917 | Switzerland | Nov. 30, 1943 |